Jan. 20, 1959　　　F. E. DAVIS　　　2,870,238
METER BOX COVER LOCK
Filed April 24, 1957

Inventor
Flavius E. Davis
by Roberts, Cushman & Grover
Attys

United States Patent Office 2,870,238
Patented Jan. 20, 1959

2,870,238

METER BOX COVER LOCK

Flavius E. Davis, Manchester, N. H., assignor to Anchor Manufacturing Company, Boston, Mass., a corporation of Massachusetts Application April 24, 1957, Serial No. 654,797

6 Claims. (Cl. 174—50)

In the meter box art it is customary to provide jaws in a meter box to receive blades projecting rearwardly from the base of a meter so that the meter may be attached in operative position merely by plugging the blades into the jaws. In this type of meter box it is also customary to leave the front of the box open and to provide a detachable cover for the open front, the cover having an opening through which the meter may be plugged in with the outer margin of the meter base seating on the cover around its opening.

Ordinarily the box cover is latched or fastened with screws in closed position and the meter is secured to the cover by means of a clamping ring surrounding the periphery of the meter base, the ring having an inner flange overlapping a flange around the cover opening and an outer flange overlapping the meter base. Heretofore it has been customary to locate the latch or screws in the meter opening so as to be covered and access to them prevented when the meter is inserted and sealed in position or else to provide two seals to prevent unauthorized access to the box, one to seal the cover latch in latched position and the other to seal the aforesaid ring in clamping position.

Objects of the invention are to eliminate said screws, cover latch and one of the aforesaid seals, to accomplish the purpose of both seals with a single seal, to simplify the construction of the box cover, and to reduce the danger of short circuits in attaching and detaching the meter and cover from the box.

According to the present invention the box has an open front, the cover has a meter opening, the box has rearwardly facing abutments on opposite sides of the open front and the cover has parts engaging behind the aforesaid abutments by first inserting the cover edgewise to dispose one of the aforesaid parts behind one abutment, then swinging the cover inwardly until the other part is inside the plane of the other abutment and then moving the cover edgewise in the opposite direction to dispose the other part behind the other abutment in a closed position in which the parts are disposed behind the two abutments respectively, in combination with means to prevent movement of the cover from the aforesaid position after a meter is plugged into the jaws through the aforesaid opening. While the abutments may be on any two opposite sides of the front opening, preferably they are on the top and bottom sides, and the aforesaid parts of the cover are preferably the upper and lower margins of the cover. Preferably the abutments are in the form of flanges or lips on the box. The means for locking the cover on the box comprises stop means movably mounted on the inside of the cover to prevent the cover from being moved from locked to unlocked position, the stop means being inaccessible after a meter is inserted so that the cover cannot be removed past the aforesaid abutment without removing the meter.

For the purpose of illustration a typical embodiment of the invention is shown in the accompanying drawings in which Fig. 1 is a side view with the meter in place and the side of the box broken away, the box cover and meter clamping ring being shown in section;

Figure 1:
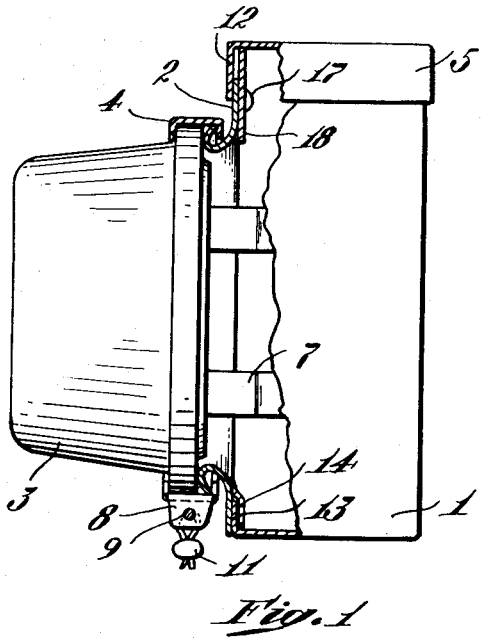

The particular embodiment of the invention chosen for the purpose of illustration comprises a meter box 1 having an open front, a removable cover 2 for the open front, a meter 3 and a sealing ring 4 overlapping a flange around the meter opening in the cover. Telescoping over the upper end of the box is a cap 5 which is welded or otherwise fastened to the box. Mounted on the inside of the back of the box are the usual meter jaws 7 to receive the usual meter blades projecting rearwardly from the base of the meter. The ends of the sealing ring 4 have flanges 8 for securing the ends of the ring together with a bolt 9 and sealing the ring in clamping position with the seal 11 in the usual way.

At the top and bottom of the open front the cap and box are provided with inturned flanges or lips 12 and 13 respectively. As shown in Fig. 1 the upper edge of the cover slips upwardly behind the lip 12 and the lower margin of the cover overlaps the outside of the lip 13. Fastened to the inside of the bottom of the cover by means of rivets or welding or other suitable means is a plate 14 which overlaps the inside of the lip 13 when the cover is in the locked position shown in Figs. 1 and 4. To remove the cover it is lifted to the position shown in Fig. 2 and the lower end is then swung outwardly to a position such as illustrated in Fig. 3, after which the cover may be slipped downwardly out of the box. As shown in Figs. 3 and 4 of the cover is provided with side flanges 16 which overlap the sides of the box.

Pivotally mounted on the inside of the upper end of the cover, by means of a rivet 17, is a stop 18 which is movable from the operative position shown in full lines to the inoperative position shown in broken lines. The lower end of the stop has a recess 19 into which a screw driver or other tool may be inserted to swing the latch from one position to the other, the rivet 17 holding the stop tightly in each position. As shown in Fig. 4 the upper end of the stop is beveled so that it does not overlap the lip 12 when the stop is in inoperative position. Movement of the stop may be limited by dimples 21 and 22 embossed in the upper end of the cover on opposite sides of the stop. As shown in Fig. 4 the nose of the stop moves past dead-center position when the stop is swung to operative position so that upward force applied to the cover does not tend to swing it to inoperative position.

Figure 2:
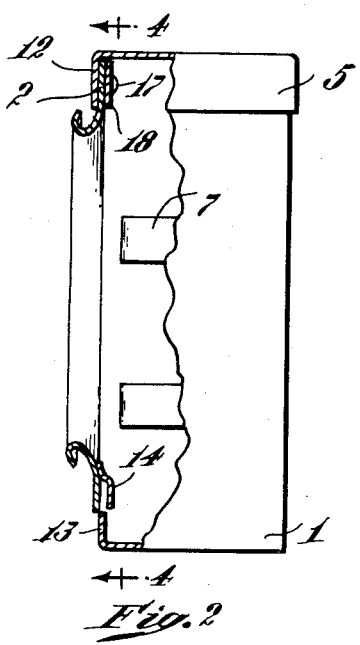
Fig. 2 is a similar view showing the meter removed and the cover lifted to unlocked position.
Figure 3:
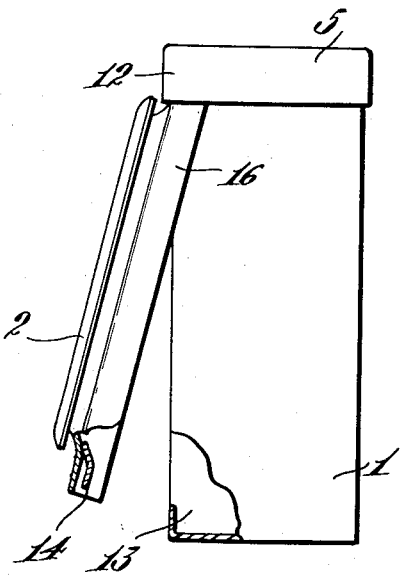
Fig. 3 is a side elevation of the box and cover with the cover swung outwardly to a position where it can be slipped edgewise out of the box.
Figure 4:
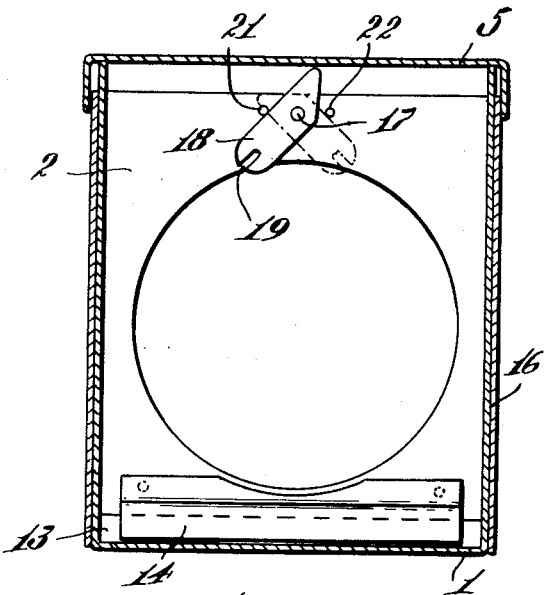
Fig. 4 is a section on line 4—4 of Fig. 2, showing the aforesaid stop means in operative position by full lines and in inoperative position by broken lines.

To assemble the parts the stop 18 is moved to inoperative position, the upper end of the cover is inserted behind the lip 12 as shown in Fig. 3, the cover is then swung to the position shown in Fig. 2 and the cover is then dropped to the position shown in Figs. 1 and 4, after which the stop 18 is swung from inoperative position to operative position by reaching through the meter opening. With the stop in the operative position shown in Figs. 1 and 4 the cover cannot be lifted to the position shown in Fig. 2. Therefore after the meter has been installed and sealed, thereby obstructing access to the stop 18, the cover cannot be removed. Thus instead of locking the cover in closed position with a latch which can be easily broken, it is positively held in closed position by a stop which prevents edgewise movement of the cover and which cannot be easily broken by any force which can be applied to it from outside the sealed box.

It should be understood that the present disclosure is for the purpose of illustration only and that this invention includes all modifications and equivalents which fall within the scope of the appended claims.

I claim:

1. Apparatus of the character referred to comprising a meter box, a box cover having a meter opening to receive a meter, said box having rearwardly facing abutments on opposite sides of said opening and said cover having edgewise movement transversely of the axis of the meter in opposite directions and having parts engaging behind said abutments by movement edgewise in one direction to dispose one part behind one abutment, then swinging the cover inwardly until the other part is inside the plane of the other abutment, and then moving the cover edgewise in the other direction to dispose the other part behind the other abutment in a closed position in which the parts are disposed behind the two abutments respectively, the dimension of the cover lengthwise of said movement being less than the corresponding dimension of the box by at least the width of said other abutment so that in said swinging the cover can clear said other abutment, and stop means movably mounted on the inside of the cover to prevent said movement in the first direction, said stop means being inaccessible after a meter is inserted, whereby the cover cannot be removed past said abutments without removing the meter.

2. Apparatus of the character referred to comprising a meter box, a box cover having an opening to receive a meter, said box having rearwardly facing abutments on opposite sides of said opening and said cover having parts engaging behind said abutments respectively in a locked position in which the cover cannot be removed from the box, the cover having edgewise movement transversely of the axis of the meter opening from said locked position to an unlocked position in which the cover is disengaged from one abutment so that it can be removed by swinging it around the other abutment, the dimension of the cover lengthwise of said movement being less than the corresponding dimension of the box by at least the width of said one abutment so that in removing the cover it can clear the one abutment, and stop means movably mounted on the inside of the cover to prevent said movement, said stop means being inaccessible after a meter is inserted, whereby the cover cannot be removed past said abutments without removing the meter.

3. Apparatus of the character referred to comprising a meter box, a box cover having a meter opening to receive a meter, said box having upper and lower rearwardly facing abutments above and below said opening respectively and said cover being movable edgewise upwardly and downwardly, the upper and lower ends of said cover engaging behind said abutments by edgewise movement upwardly to dispose the upper end behind the upper abutment, then swinging the cover inwardly until the lower end is inside the plane of the lower abutment, and then moving the cover downwardly to dispose the lower end behind the lower abutment in a closed position in which the ends are disposed behind the two abutments respectively, the height of the cover being less than that of the box by at least the width of the lower abutment so that in said swinging the cover can clear the lower abutment, and stop means movably mounted on the inside of the cover to prevent said upward movement, said stop means being inaccessible after a meter is inserted, whereby the cover cannot be removed past said abutments without removing the meter.

4. Apparatus of the character referred to comprising a meter box, a box cover having an opening to receive a meter, said box having rearwardly facing abutments above and below said opening respectively and the upper and lower ends of said cover engaging behind said abutments respectively in a locked position in which the cover cannot be removed from the box, the cover having upward movement from said locked position to an unlocked position in which the cover is disengaged from the lower abutment so that it can be removed, the height of the cover being less than that of the box by at least the width of the lower abutment so that in removing the cover it can clear the lower abutment, and stop means movably mounted on the inside of the cover to prevent said movement, said stop means being inaccessible after a meter is inserted, whereby the cover cannot be removed past said abutments without removing the meter.

5. Apparatus of the character referred to comprising a meter box, a box cover having a meter opening to receive a meter, said box having upper and lower inturned flanges above and below said opening respectively and said cover being movable edgewise upwardly and downwardly, the upper and lower ends of said cover engaging behind said flanges by edgewise movement upwardly to dispose the upper end behind the upper flange, then swinging the cover inwardly until the lower end is inside the plane of the lower flange, and then moving the cover downwardly to dispose the lower end behind the lower flange in a closed position in which the ends are disposed behind the two flanges respectively, the height of the cover being less than that of the box by at least the width of the lower flange so that in said swinging the cover can clear the lower flange, and stop means movably mounted on the inside of the cover to prevent said upward movement, said stop means being inaccessible after a meter is inserted, whereby the cover cannot be removed past said flanges without removing the meter.

6. Apparatus of the character referred to comprising a meter box, a box cover having an opening to receive a meter, said box having rearwardly facing flanges above and below said opening respectively and the upper and lower ends of said cover engaging behind said flanges respectively in a locked position in which the cover cannot be removed from the box, the cover having upward movement from said locked position to an unlocked position in which the cover is disengaged from the lower flange so that it can be removed, the height of the cover being less than that of the box by at least the width of the lower flange so that in removing the cover it can clear the lower flange, and stop means movably mounted on the inside of the cover to prevent said movement, said stop means being inaccessible after a meter is inserted, whereby the cover cannot be removed past said flanges without removing the meter.

References Cited in the file of this patent

UNITED STATES PATENTS

| | | |
|---|---|---|
| 1,269,770 | Wurdack | June 18, 1918 |
| 2,695,923 | Lajeunesse et al. | Nov. 30, 1954 |
| 2,742,173 | Janson | Apr. 17, 1956 |